Sept. 7, 1965 G. N. HOWATT 3,204,457
ULTRASONIC FLOWMETER
Filed Jan. 23, 1962 3 Sheets-Sheet 2
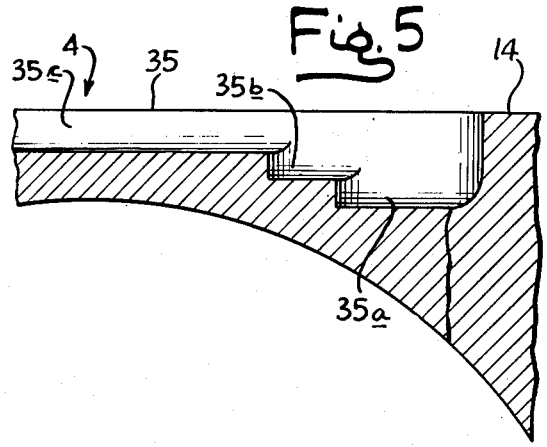
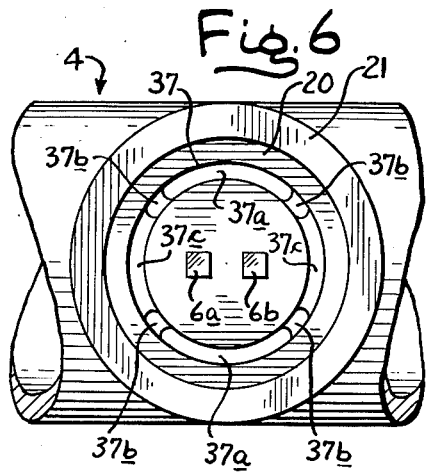
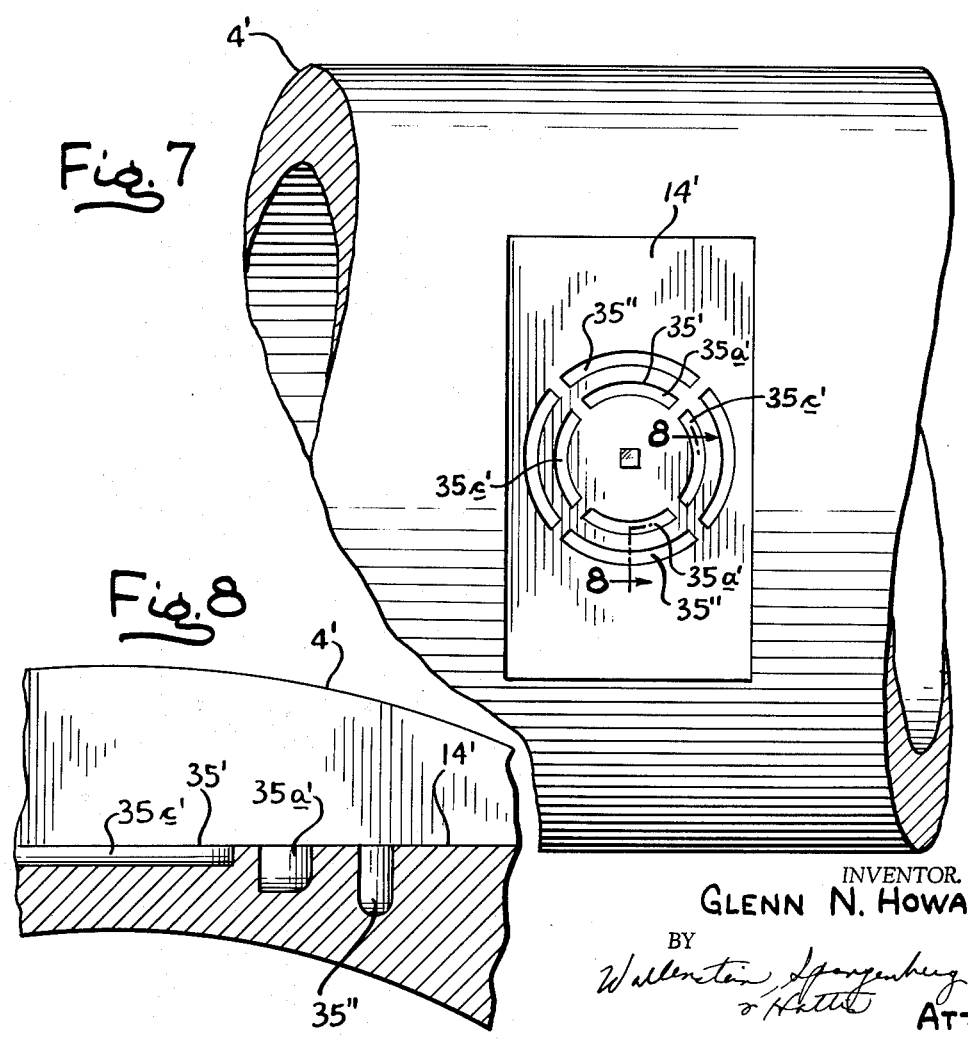
INVENTOR.
GLENN N. HOWATT
BY
ATTYS

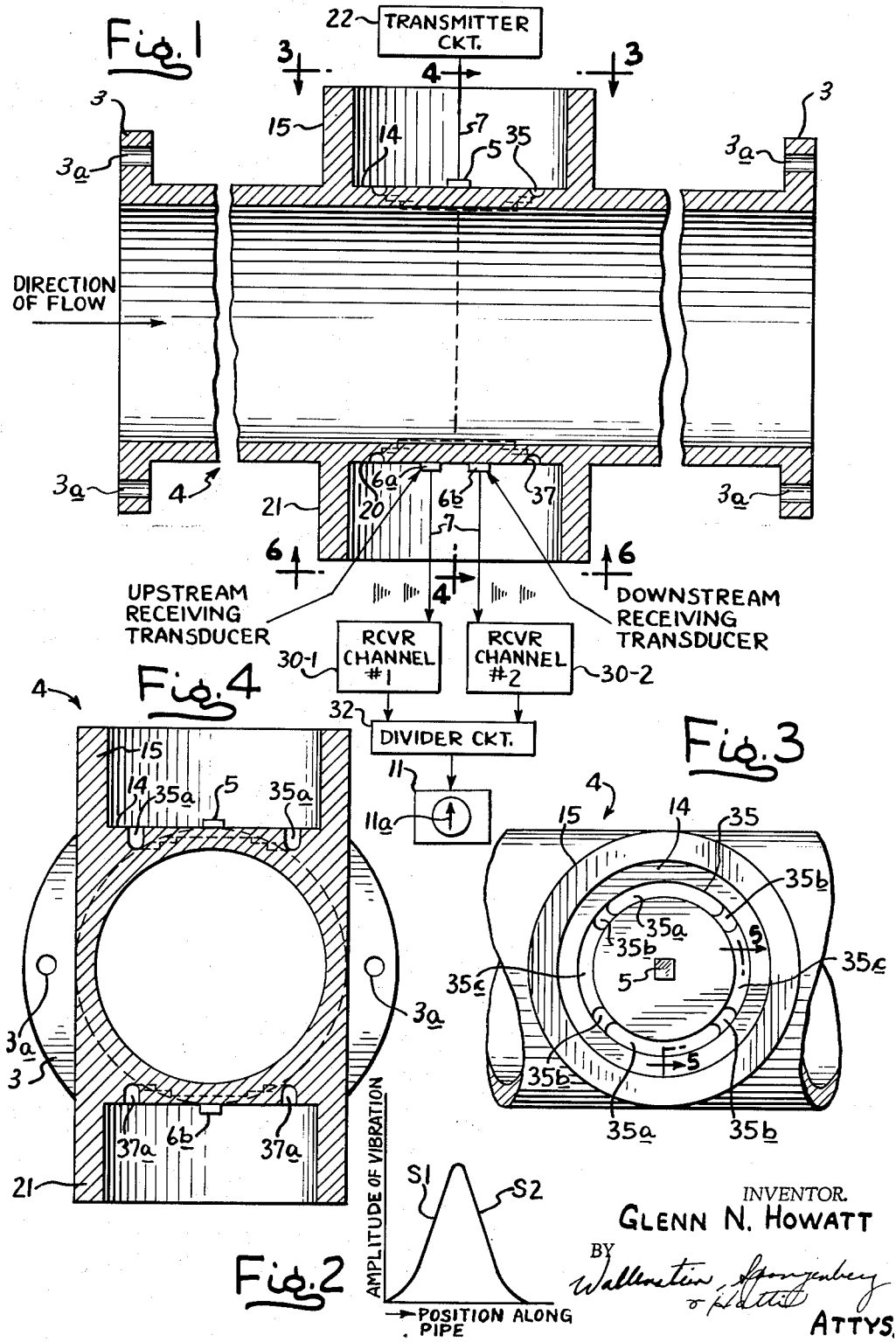

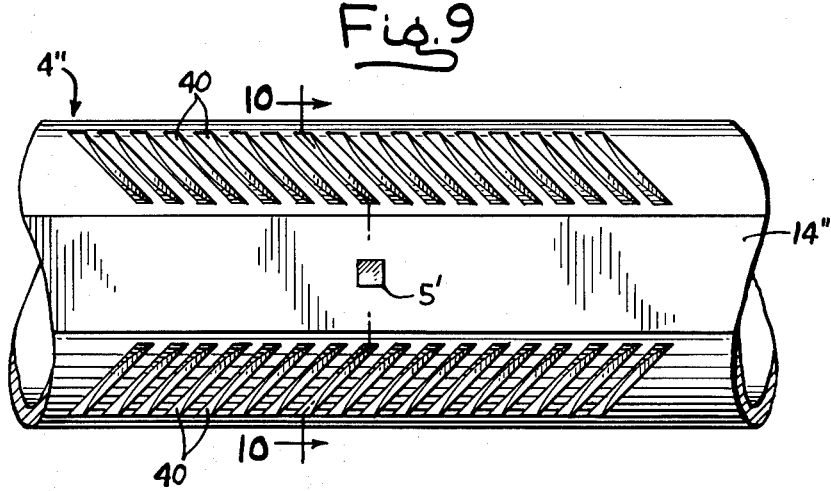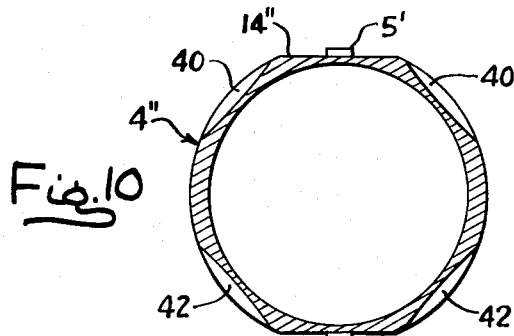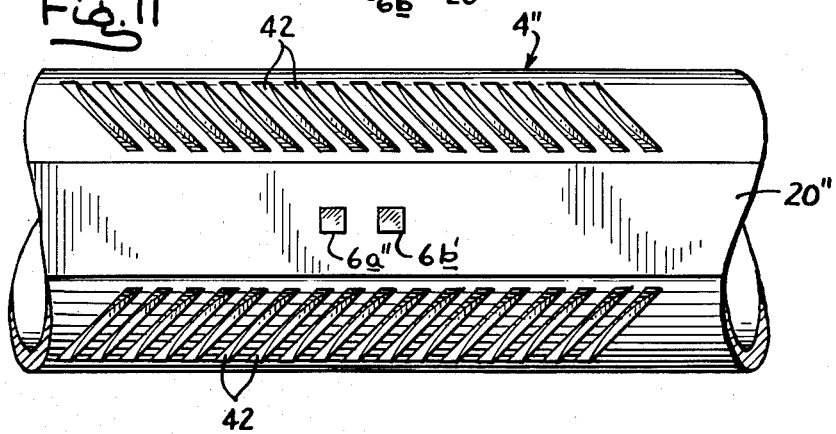

United States Patent Office 3,204,457
Patented Sept. 7, 1965

3,204,457
ULTRASONIC FLOWMETER
Glenn N. Howatt, Metuchen, N.J., assignor to Gulton Industries, Inc., Metuchen, N.J., a corporation of New Jersey
Filed Jan. 23, 1962, Ser. No. 168,145
8 Claims. (Cl. 73—194)

In recent years a new form of ultrasonic flowmeter has been developed operating on the deflection of an ultrasonic beam directed across a conduit carrying the fluid involved by the movement of the fluid in the conduit. The degree of deflection of the beam is a measure of the flow velocity. The beam pattern is such that the amplitude thereof varies along the axis of the conduit. A measure of the velocity of fluid flow can thus be obtained by obtaining a measure of the amplitude of the ultrasonic beam at a fixed point in the conduit.

It is most advantageous that the ultrasonic transmitting and receiving elements (referred to as transducers) be located on the outside of the conduit involved, so that no flow restrictions or corrosion problems are involved. To this end, a piezoelectric transmitting transducer is mounted on one side of a section of pipe carrying the fluid to be measured, and one or more piezoelectric receiving transducers are mounted on the opposite side of the pipe, the average wall thickness at the point of attachment of the transducers thereto preferably being in the neighborhood of a multiple of a half wave length at the frequency of the ultrasonic waves to be generated. The transmitting transducer vibrates the walls of the pipe to produce a laterally directive ultrasonic beam in the fluid flowing in the pipe. The beam directed across the pipe strikes the opposite inside wall thereof and in so doing sets up vibrations in the wall. In one type of beam deflection flowmeter, a receiving transducer is located upstream and/or downstream from the transmitting transducer a distance less than the beam width so that the ultrasonic beam is detected thereby when the beam first strikes the pipe wall. This type of flowmeter has many advantages over other types of flowmeters wherein one or more receiving transducers are located a substantial distance downstream from the transmitting transducer, where the transmitted beam, directed at an angle to the pipe axis, reaches the point where a receiving transducer is mounted only after a number of reflections.

In the first-mentioned type of flowmeter, where the transmitting and receiving transducers are positioned close to one another on opposite sides of the pipe, under some circumstances appreciable amounts of the transmitted vibration energy may reach the receiving transducer directly through the walls of the pipe. The vibrations so received may interfere with or mask the signals received through the liquid flowing in the pipe, to create inaccuracies in the resulting measurement.

It is, accordingly, an object of the present invention to provide an improved ultrasonic flowmeter of the type where transmitting and receiving transducers are mounted on the outside of a pipe wherein transmission of vibration energy to the receiving transducer directly through the walls of the pipe is greatly minimized. A related object of the invention is to provide an ultrasonic flowmeter as just described wherein the means for minimizing the direct coupling of vibration energy between the transmitting and receiving transducers through the walls of the pipe is of simple and economical construction.

In accordance with the present invention, discontinuities are formed in or on the walls of the pipe between the transmitting and receiving transducers for interrupting the transmission of vibrations to the receiving transducer. The discontinuities are most advantageously formed by grooving the walls of the pipe between the transmitting and receiving transducers. For best results, a series of such grooves or other discontinuities are spaced in a direction between the transmitting and receiving transducers so that the vibrations must circumvent a number of vibration transmission hindering discontinuities.

Other aspects of the invention relate to the specific configurations of the grooves and their relationship to one another and the transmitting and receiving transducers.

The above and other objects, advantages and features of the present invention will become more apparent upon making reference to the specification to follow, the claims and the drawing wherein:

FIG. 1 shows a longitudinal section through a pipe section constructed in accordance with the present invention and further shows the relationship of the transmitting and receiving transducers mounted thereon and the various basic circuit components utilized with the transducers in the application of the present invention;

FIG. 2 is a curve showing the ultrasonic beam pattern generated in the fluid moving in the pipe by the transmitting transducer;

FIG. 3 is a view of the pipe shown in FIG. 1 taken in a plane 3—3 therein and shows the relationship between the transmitting transducer and the pipe grooving;

FIG. 4 is a transverse section through the pipe shown in FIG. 1, taken substantially along the line 4—4 therein;

FIG. 5 is an enlarged sectional view of the portion of the pipe shown in FIG. 3 as seen along the line 5—5 therein;

FIG. 6 is a view of the pipe shown in FIG. 1 taken in a plane 6—6 therein and shows the relationship between the receiving transducers and the pipe grooving;

FIG. 7 is a fragmentary view of a modified form of the invention where the pipe is much larger than that shown in FIGS. 1 through 5 and the grooving has a different configuration;

FIG. 8 is an enlarged sectional view of the portion of the pipe shown in FIG. 7 as seen along the line 8—8 therein;

FIG. 9 is a top plan view of the transmitting transducer side of a still further modified pipe construction using a substantially modified groove configuration;

FIG. 10 is a sectional view through FIG. 9, taken substantially along the line 10—10 therein; and FIG. 11 is a bottom plan view of the receiving transducer side of the pipe construction shown in FIGS. 9 and 10.

To best understand the invention, it is desirable first to explain the basic components of the flowmeter system illustrated in the drawing and their manner of operation. Then, the features of the present invention will be described. Referring now to FIGS. 1-6, the flowmeter there shown is a beam deflection type flowmeter including a pipe section 4 designed to be connected between two pipe sections in a pipe system carrying the fluid to be measured. The pipe section 4 has flanges 3—3 at the ends thereof with bolt or screw-receiving holes 3a therein for connecting the same to similarly flanged portions of a pair of pipes (not shown). A transmitting transducer 5 and a pair of receiving transducers 6a and 6b are adhesively or otherwise secured to the outside of the pipe section 4, and connecting wires 7 extend from these transducer elements to electrical transmitting and receiving circuitry shown in box form. The circuitry preferably includes a direct current meter 11 having a pointer 11a which normally assumes a centered zero position under no flow conditions, and is deflected to the right of this position to a degree dependent on the flow rate when fluid flows through the pipe section 4 in one direction, and to the left of this position to a degree dependent on the flow rate when the fluid flows through the pipe section in the opposite direction.

The transmitting transducer comprises a piezoelectric crystal of quartz, barium titanate, lead-zirconate titanate or the like. In one instance, the crystal was a thin square plate 3/16 inch wide. The transmitting crystal 5 is mounted on a flat portion 14 of the pipe section which is parallel to the longitudinal axis thereof. The flat portion can be formed on a boss as illustrated or by machining a flat on the pipe section. The boss is shown surrounded by a circular wall 15 projecting from the pipe section. The pipe section at this point preferably has an average wall thickness which is a multiple of half wave lengths at the frequency of the ultrasonic waves to be transmitted therethrough. The thin transmitting crystal illustrated in the drawings is mounted in face-to-face contact with the flat pipe portion 14 to direct an ultrasonic beam at right angles to the longitudinal axis of the pipe section.

A transmitter circuit 22 is provided for energizing the transmitting crytsal 5 at an ultrasonic frequency, such as one megacycle (one million cycles per second). The transmitter circuit 22 preferably intermittently energizes the transmitting crystal resulting in pulsations of ultrasonic energy passing through the walls of the pipe section and into the fluid therein. Because of the substantially transverse direction of the transmitted signals, echoes of these pulsations will be received by the receiving crystals as the ultrasonic pulsations rebound against the pipe walls. The echo pulsations diminish in magnitude with time until they substantially disappear. The pulse repetition rate of the transmitter circuit is selected so that the echoes from a given transmitted ultrasonic pulsation substantially decay to zero before the transmission of the next transmitted puslation.

It is most advantageous that the transmitting crysal 5 generate a directive beam having oppositely sloping segments S1 and S2 (FIG. 2) which are substantially linear. The receiving crystals 6a and 6b are spaced respectively to intercept the substantially linear segments S1 and S2 of the beam over the range of flow rates to be measured. The receiving crystals 6a and 6b which may be thin plates of piezoelectric material like the transmitting crystal are mounted on a flat portion 20 on the pipe section 4 which flat portion is located diametrically opposite the flat portion 14 on which the transmitting crystal 5 is mounted. The flat portion 20 is illustrated as being formed on a raised boss surrounded by a circular wall 21 projecting from the pipe section. The flat portion 20 is parallel to the longitudinal axis of the pipe section 4 and forms a wall preferably having an average thickness which is a multiple of half wave lengths at the frequency involved. The receiving crystals 6a and 6b are positioned respectively slightly upstream and downstream by the same distance from the transmitting crystal 5. Under no-flow conditions, the receiving crystals are positioned equidistant from the beam axis to intercept the center points of the linear segments S1 and S2 of the transmitted ultrasonic beam where both crystals receive signals of the same intensity. Since the transmitted ultrasonic beam is directed transversely of the pipe axis, and the beam is symmetrical with respect to the axis of the beam, longitudinal movement of the beam by the movement of fluid in the pipe section 4 will result in an increase in the signal amplitude intercepted by the downstream receiving crystal and a similar decrease in the signal amplitude intercepted by the upstream receiving crystal provided the linear segments of the beam remain opposite the receiving crystals. This similar increase and decrease of the signals received by the latter crystals upon movement of fluid through the pipe section is not obtained when the transmitted beam is directed at an angle to a transverse line, and a loss of sensitivity results in such case when the outputs of the receiving crystals are divided.

The outputs of the receiving crystals are respectively fed to separate receiver channels 30–1 and 30–2 which amplify, rectify and filter the resultant output to provide direct current output voltages which are respectively proportional to the magnitude of the ultrasonic signals received by the receiving crystals 6a and 6b. The direct current outputs of the receiver channels 30–1 and 30–2 are most advantageously fed to a suitable divider circuit 32 which provides at the output thereof a voltage which is a measure of the ratio of the two voltages. The divider circuit 32 most advantageously is the divider circuit disclosed in a copending application Serial No. 141,347, filed September 28, 1961, now Pat. No. 3,129,463 of Leonard Kleinberg entitled "Quotient Circuit." In the case where the direction of flow is to the right as viewed in FIG. 2, the Kleinberg divider circuit 32 provides a voltage of a first polarity which is a measure of the flow rate involved. Where the direction of flow is to the left as viewed in FIG. 2, the Kleinberg divider circuit produces a negative voltage which is a measure of the flow rate involved. The direct current output of the divider circuit 32 is fed to the driect current meter or indicator 11 which is capable most advantageously of indicating voltages of both possible polarities.

For most accurate results, the signal to noise ratio of the output of the receiving crystals 6a and 6b should be a maximum. Since the transmitting and receiving crystals are located relatively closely together, it is possible that some of the transmitted ultasonic energy will reach the receiving crystals directly through the walls of the pipe section. The amplitude of the signal reaching the receiving crystals by this path will not vary with the velocity of fluid in the pipe and will introduce an undesired noise component in the output of the receiving crystals. In accordance with the present invention, means are provided for minimizing the coupling of ultrasonic vibrations between the transmitting and receiving crystals directly through the walls of the pipe section 4. In accordance with the form of the invention shown in FIGS. 1 through 6, this is achieved in part by machining a groove 35 in the flat pipe portion 14 which groove is shown to be circular and surrounds the transmitting crystal 5. A similar circular groove 37 is formed in the flat pipe portion 20 to surround the receiving crystals 6a and 6b. The grooves extends as far into the walls of the pipe section 4 as is feasible considering the strength requirements thereof. Since the inside walls of the pipe section 4 are curved, the spacing between various points on the flat portions 14 and 20 and the inside of the pipe will vary. To obtain maximum use out of the grooves 35 and 37, the segments thereof in the thicker portion of the pipe are cut more deeply than the segments cut in the thinner portions of the wall, so that the average spacing between different segments of the grooves and the inside of the pipe section will be of comparable magnitudes. To this end, each of the grooves 35 and 37 have a pair of outermost segment 35a or 37a of maximum depth centered on a transverse axis, four segments 35b or 37b of intermediate depth at the ends of the segments 35a or 37a, and a pair of segments 35c or 37c of minimum depth centered on the longitudinal axis of the pipe section.

The groove segments 35a and 37a being located directly in the path between the transmitting and receiving crystals provide sound reflecting discontinuities which hinder the coupling of ultrasonic energy between the transmitting and receiving crystals. The other segments of these grooves prevent the transmission of any appreciable amounts of ultrasonic energy in directions along the length of the pipe to prevent standing waves and other undesired effects. The circular grooves 35a and 37a thus concentrate the ultrasonic energy in the areas of the pipe where the sound energy is desired and isolates the same from other portions of the pipe. Some ultrasonic energy escapes the groove surrounded areas, since the isolation provided thereby is not complete.

The following are exemplary dimensions for the pipe section and grooves 35a and 37a where the frequency was one megacycle, it being understood that these dimensions are not critical:

Inside diameter of grooves 35 and 37—1¼″
Width of circular grooves 35 and 37—⅛″
Depth of groove segments 35a and 37a—.175″
Depth of groove segments 35b and 37b—.125″
Depth of groove segments 35c and 37c—.075″
Inside diameter of pipe section—2″
Outside diameter of pipe section—2⅜″
Length of groove segments 35a and 37a—90°
Length of groove segments 35b and 37b—15°
Length of groove segments 35c and 37c—60°

Reference should now be made to FIGS. 7 and 8 which show a modified form of the present invention. In this form of the invention, instead of having one circular groove, each of the grooves 35 and 37 is replaced by a pair of concentric segmental or intermittent circular grooves like 35′–35″ in FIG. 7 formed on a flat like 14′. The pipe section 4′ illustrated in FIGS. 7 and 8 is substantially larger than the pipe section 4 shown in FIGS. 1 through 6. The flats are formed by machining a perfectly cylindrical pipe section. The smaller segmental circular groove 35′ is substantially similar to the groove 35 in the form of the invention previously described except that the groove is interrupted such as at the 45° points, so that the pipe wall has the full thickness at these points to strengthen the section of the pipe cut by the groove. In the illustrated embodiment of the invention, segments 35a′ and 35c′ of the segmental circular groove 35′ are provided which have different depths as shown in FIG. 8 so that the average thicknesses of the pipe walls beneath these segments are of comparable magnitudes. The larger outer segmental circular groove 35″ is formed similarly to the segmental circular groove 35′. With this form of the invention, greater isolation of the ultrasonic energy is achieved since, among other reasons, the ultrasonic waves must traverse two discontinuous areas rather than one to escape the groove encircled portions of the pipe section.

Referring now to the preferred form of the invention shown in FIGS. 9 through 11 which provide substantially improved isolation between the transmitting and receiving crystals. This form of the invention is shown applied to a relatively small diameter pipe section 4″ like that shown in the form of the invention shown in FIGS. 1 through 6. In the form of the invention shown in FIGS. 9 through 11, the circular grooves 35 and 37 in FIGS. 1 through 6 are each replaced by groups 40—40 (or 42—42) of substantially straight, inclined, longitudinally spaced grooves respectively positioned on the opposite lateral sides of the transmitting and receiving crystals 5′ and 6a′–6b′. These grooves may be formed by milling them into the pipe walls. They incline at an angle to the longitudinal axis of the pipe section so that the ultrasonic waves are reflected thereby longitudinally of the pipe section away from the receiving crystals. The inclined slots are sufficiently close together that they overlap considerably. The ultrasonic waves thus must traverse at least two grooves on each side of the pipe in each direction around the pipe to reach the receiving crystals. For best results, each group of longitudinally spaced grooves encompasses areas extending substantially longitudinally beyond the longitudinal margins of the transmitting and receiving crystals.

As illustrated in FIGS. 9 through 11, the pipe section 4″ has flattened areas 14″ and 20″ upon which the transmitting and receiving crystals are respectively mounted. These flattened areas are formed by machining flats longitudinally of the pipe section rather than transversely thereof, as in the form of the invention shown in FIGS. 7 and 8.

The following are exemplary dimensions for the pipe section of FIGS. 9 through 11, it being understood that these dimensions are not critical:

Inside diameter of pipe section—2″
Outside diameter of pipe section—2¼″
Length of each of the grooves 40 and 42—about ¾″
Inclination of grooves 40 and 42—45°
Approximate depth of grooves—³⁄₃₂″
Spacing of grooves—⅛″
Width of grooves—⅛″
Longitudinal extent of pipe section covered by each of the longitudinally spaced groups of grooves—between 4″ and 5″

It should be understood that numerous modifications may be made in the preferred forms of the invention described above without deviating from the broader aspects of the invention. For example, although the present invention has been illustrated in connection with a beam reflection type flowmeter, the present invention has utility also in most ultrasonic fluid flow measuring devices where it is desired to minimize the direct coupling of transmitting and receiving transducers mounted on the outside of a pipe.

What I claim as new and desire to protect by Letters Patent of the United States is:

1. An ultrasonic flowmeter comprising a conduit section carrying the fluid to be measured, transmitting transducer means mounted on the outside of said conduit section to direct an ultrasonic beam through the walls of the conduit section into the fluid therein, receiving transducer means mounted on the outside of said conduit section at a point spaced from said transmitting transducer means to receive ultrasonic signals transmitted from said transmitting transducer means through said fluid, and means forming discontinuities in the walls of the conduit section between the transmitting and receiving transducer means for minimizing couplings of vibrations to the receiving transducer means directly through the conduit section walls, said discontinuities surrounding said transmitting transducer means to minimize coupling of vibration energy therebetween in both circumferential and longitudinal directions.

2. An ultrasonic flowmeter comprising a conduit section carrying the fluid to be measured, transmitting transducer means mounted on the outside of said conduit section to direct an ultrasonic beam through the walls of the conduit section into the fluid therein, receiving transducer means mounted on the outside of said conduit section at a point spaced from said transmitting transducer means to receive ultrasonic signals transmitted from said transmitting transducer means through said fluid, and means forming discontinuities in the walls of the conduit section between the transmitting and receiving transducer means for minimizing couplings of vibrations to the receiving transducer means directly through the conduit section walls, and forming a pattern comprising at least two concentric circles surrounding said transmitting transducer means to minimize coupling of vibration energy therebeyond in both circumferential and longitudinal directions.

3. An ultrasonic flowmeter comprising a conduit section carrying the fluid to be measured, transmitting transducer means mounted on the outside of said conduit section to direct an ultrasonic beam through the walls of the conduit section into the fluid therein, receiving transducer means mounted on the outside of said conduit section at a point spaced from said transmitting transducer means to receive ultrasonic signals transmitted from said transmitting transducer means through said fluid, and means forming discontinuities in the walls of the conduit section between the transmitting and receiving transducer means for minimizing couplings of vibrations to the receiving transducer means directly through the conduit section walls, said discontinuity form means comprising grooving in the walls of the conduit section, said grooving being intermittent so that the conduit section has its full wall thickness between spaced sections of the grooving.

4. In an ultrasonic flowmeter comprising a conduit section carrying the fluid to be measured, transmitting transducer means mounted on the outside of the conduit section to direct an ultrasonic beam through the walls of the conduit section into the fluid therein, and receiving transducer means mounted on the outside of the conduit section in spaced relation to said transmitting transducer means to receive ultrasonic signals transmitted from said transmitting transducer means through said fluid, the improvement comprising: means forming discontinuities in the walls of the conduit section between said transmitting and receiving transducer means for minimizing coupling of vibrations from said transmitting transducer means to said receiving transducer means directly through the conduit section walls, said discontinuity forming means comprising grooves in the conduit walls encircling both the transmitting and receiving transducer means.

5. In an ultrasonic flowmeter comprising a conduit section carrying the fluid to be measured, transmitting transducer means mounted on the outside of the conduit section to direct an ultrasonic beam through the walls of the conduit section into the fluid therein, and receiving transducer means mounted on the side of the conduit section opposite the one on which the transmitting transducer means is mounted, said receiving transducer means receiving ultrasonic signals transmitted from said transmitting transducer means through said fluid, the improvement comprising means forming discontinuities in the walls of the conduit section between said transmitting and receiving transducer means in both directions around the conduit section from the transmitting transducer means for minimizing coupling of vibrations to the receiving transducer means directly through the conduit section walls, said discontinuity forming means comprising grooves in the conduit walls encircling both the transmitting and receiving transducer means.

6. In an ultrasonic flowmeter comprising a conduit section carrying the fluid to be measured, transmitting transducer means mounted on the outside of the conduit section to direct an ultrasonic beam through the walls of the conduit section into the fluid therein, and receiving transducer means mounted on the side of the conduit section opposite the one on which the transmitting transducer means is mounted, said receiving transducer means receiving ultrasonic signals transmitted from said transmitting transducer means through said fluid, the improvement comprising means forming discontinuities in the walls of the conduit section between said transmitting and receiving transducer means in both directions around the conduit section from the transmitting transducer means for minimizing coupling of vibrations to the receiving transducer means directly through the conduit section walls, said discontinuity forming means comprising a group of longitudinally spaced elongated grooves in the conduit walls on each laterally facing side of said transmitting transducer means, said grooves extending at an angle to the longitudinal axis of the conduit and overlapping one another to prevent passage of vibrations between successive grooves without striking the defining walls thereof and to substantially increase the path length of the vibrations which ultimately pass beyond the grooves.

7. In an ultrasonic flowmeter comprising a conduit section carrying the fluid to be measured, spaced flat areas on said conduit section extending in planes parallel to the longitudinal axis of the conduit section, transmitting transducer means mounted on one of said flat areas to direct an ultrasonic beam through the walls of the conduit section into the fluid therein, and receiving transducer means mounted on the other flat area of the conduit section to receive ultrasonic signals transmitted from said transmitting transducer means through said fluid, the improvement comprising: means forming discontinuities in the walls of the conduit section between said transmitting and receiving transducer means for minimizing couplings of vibrations to the receiving transducer means directly through the conduit section walls, said discontinuity forming means comprising grooving formed in at least one of said flat areas so as to surround the transducer means mounted thereon, said grooving varying in depth as a function of the average thickness of the walls of the conduit section in which the section of the grooving involved is located.

8. An ultrasonic flowmeter comprising a conduit section carrying the fluid to be measured, transmitting transducer means mounted on the outside of said conduit section to direct an ultrasonic beam through the walls of the conduit section into the fluid therein, receiving transducer means mounted on the outside of said conduit section at a point spaced from said transmitting transducer means to receive ultrasonic signals transmitted from said transmitting transduced means through said fluid, and means forming discontinuities in the walls of the conduit section between the transmitting and receiving transducer means which discontinuities are positioned circumferentially between said transmitting and receiving transducer means for minimizing coupling of vibrations to the receiving transducer means directly through the conduit section walls and also spaced longitudinally of said transducer means for minimizing coupling of vibrations longitudinally of the conduit, said discontinuities comprising circular grooving on the outside section surrounding at least one of the transmitting and receiving transducers, the distance between the inner margin of the grooving and the inside surface of the conduit section being substantially constant.

References Cited by the Examiner

UNITED STATES PATENTS

| | | | |
|---|---|---|---|
| 2,874,568 | 2/59 | Petermann | 73—194 |
| 2,912,856 | 11/59 | Kritz | 73—194 |
| 2,931,223 | 4/60 | Kritz | 73—194 |

RICHARD C. QUEISSER, *Primary Examiner.*

ROBERT L. EVANS, *Examiner.*